Feb. 6, 1951
L. Q. SENG
2,540,298
VALVE
Filed July 4, 1945
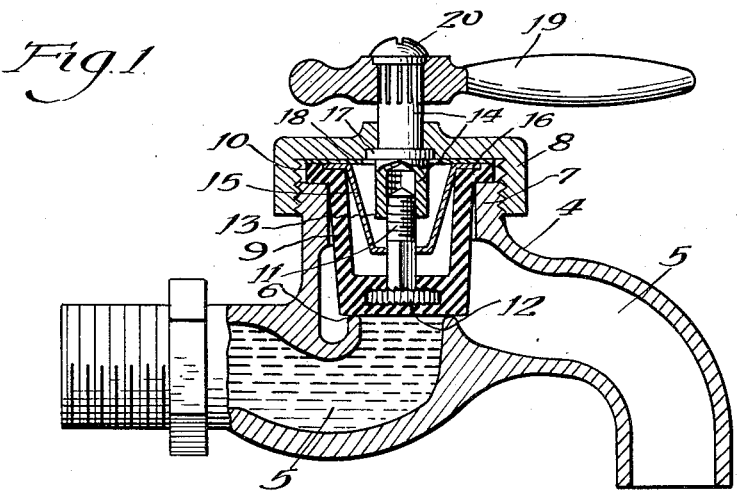
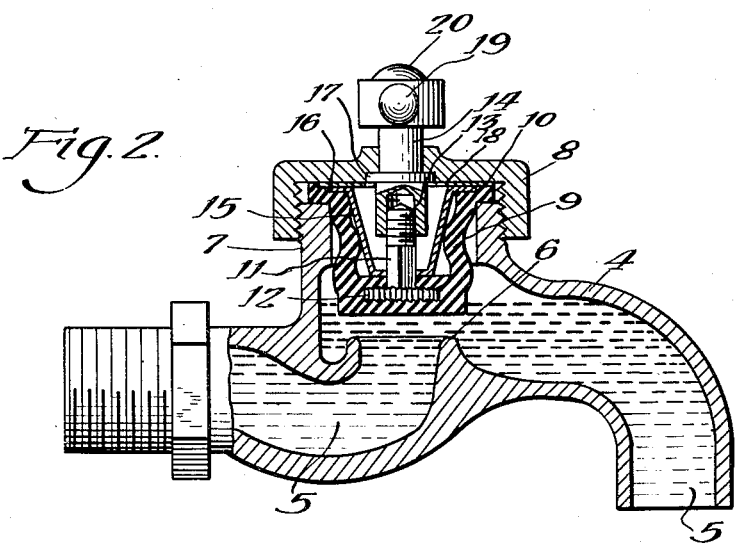
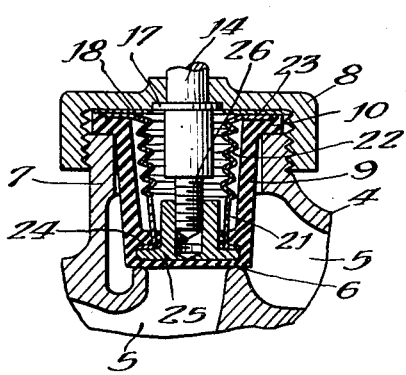
Inventor:
Lambert Q. Seng
By:
Chritton, Wiles, Schroeder,
Merriam and Hofgren
Attorneys Patented Feb. 6, 1951

2,540,298

UNITED STATES PATENT OFFICE 2,540,298

VALVE

Lambert Q. Seng, Chicago, Ill.

Application July 4, 1945, Serial No. 603,171

3 Claims. (Cl. 251—24)

This invention relates to an improved valve which can be used in ordinary faucets.

The primary object of the invention is to provide a simple molded sack of rubber-like material which not only serves to close the valve seat, but also prevents fluids from entering the valve mechanism or leaking around the valve stem.

Another object of the invention is to provide a simple and inexpensive device which may be readily installed or replaced without the use of tools.

Still another object of the invention is to provide a simple molded rubber sack and guide means for preventing the sack from twisting when the valve stem is turned.

The invention is illustrated in a preferred embodiment in the accompanying drawings, in which—

Figure 1 is an elevational view partly in section, showing the invention applied to an ordinary faucet; Fig. 2, a view similar to Fig. 1, but showing the valve in open position; and Fig. 3, a fragmentary sectional view showing a modified type of guide.

In the embodiment illustrated, a hollow faucet body 4 has a liquid passage 5 provided with a valve seat 6. The body, opposite the valve seat, has a hollow boss 7, which is threaded to receive a cap 8.

A cup-shaped molded rubber sack 9 has an outwardly extending flange 10 which is adapted to serve as a gasket between the cap 8 and the end of the boss 7. A bolt 11 has a serrated head 12 molded in the closed end of the sack and has a threaded shank 13 which is adapted to make threaded connection with the tapped end of a valve stem 14, which is journalled in the cap 8. Preferably, the end of the shank is square in cross-section to receive a metal guide 15 which has a square aperture at its inner end and is provided with an outwardly extending flange 16, which is gripped against the rubber flange 10 by the cap 8. This guide prevents rotation of the sack when the valve stem 14 is turned.

The valve stem 14 preferably has a collar 17 which rests in a counterbored portion of the cap 8, and its lower end may bear against a metal washer 18 to prevent longitudinal movement. The valve stem may be provided at its upper end with the usual handle 19, secured in position by means of a screw 20. It will be understood, of course, that it is immaterial whether the valve stem or the member 11 affords the male thread.

To operate the faucet shown in Figs. 1 and 2, it is merely necessary to turn the handle 19, which raises the sack off of the valve seat and permits fluid to flow through the passage 5. In raising the closed end of the sack, the rubber in the side walls of the cup-shaped member is compressed.

In the embodiment illustrated in Fig. 3, a different type of guide means has been substituted, a metallic sleeve, which has collapsible accordion-like walls 22. The top of the sleeve is gripped against the gasket portion of the sack by the cap 8, as indicated at 23. The lower end of the sleeve may be molded into the closed end of the sack, as indicated at 24, with the nut 25 which receives the threaded stud 26 of the valve stem 14. The operation of the device is the same as described above.

While the embodiments illustrated show a screw connection for raising and lowering the closed end of the sack, it will be understood that other elevating means, such as cams or the like, may be substituted, if preferred.

The foregoing detailed description is given for clearness of understanding only, and no unnecessary limitations should be understood therefrom, for some modifications will be obvious to those skilled in the art.

I claim:

1. A valve for a hollow body having a liquid passage provided with a valve seat which is accessible through a removable cap, comprising: a cup-shaped hollow molded rubber sack having at its outer end a radially extending annular marginal flange adapted to form a gasket, a valve stem journalled in the cap for rotation therein but held against longitudinal movement therein, said valve stem extending into the sack and having a threaded opening in its inner end, a screw having a marginally serrated head embedded in the closed end of the sack and a threaded end portion in threaded engagement with the threads in the opening in the valve stem, said screw having a non-circular shank between its threaded portion and the closed end of the sack, a metal guide having a marginal flange clamped between the flange of the sack and the cap and having conically inclined sides extending into the sack, the inner end of the guide being closed except for a non-circular opening within which said stem is slidably mounted, the closed end of the guide contacting the inner end of the sack when the valve is fully open and being spaced therefrom when the valve is closed.

2. A valve as claimed in claim 1, in which said valve stem is formed with a radially outwardly extending annular flange contacting the cap, said sack having longitudinally extending side walls which, when the valve is opened, bulge outwardly to press against the adjacent interior of the valve body to form a tight seal therewith.

3. A valve as claimed in claim 2, having a metal washer clamped between the cap and the marginal flange of the guide, the flange of the valve stem being positioned between the washer and the cap.

LAMBERT Q. SENG.

REFERENCES CITED

The following references are of record in the file of this patent:

UNITED STATES PATENTS

| Number | Name | Date |
|---|---|---|
| 957,347 | Kennedy | May 10, 1910 |
| 1,289,434 | Fulton | Dec. 31, 1918 |
| 1,478,815 | Blauvelt | Dec. 25, 1923 |
| 1,648,884 | Giesler | Nov. 8, 1927 |
| 1,844,553 | Barlow | Feb. 9, 1932 |
| 2,089,977 | Marchant | Aug. 17, 1937 |
| 2,216,292 | Evleth | Oct. 1, 1940 |
| 2,360,603 | Ward | Oct. 17, 1944 |
| 2,381,544 | Jacobsen | Aug. 7, 1945 |

FOREIGN PATENTS

| Number | Country | Date |
|---|---|---|
| 437,463 | Great Britain | of 1935 |